US012456221B2

(12) United States Patent
Lim

(10) Patent No.: US 12,456,221 B2
(45) Date of Patent: Oct. 28, 2025

(54) ELECTRONIC APPARATUS FOR REAL-TIME HUMAN DETECTION AND TRACKING SYSTEM AND CONTROLLING METHOD THEREOF

(71) Applicant: Samsung Electronics Co., Ltd., Suwon-si (KR)

(72) Inventor: Yusun Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 412 days.

(21) Appl. No.: 18/075,875

(22) Filed: Dec. 6, 2022

(65) Prior Publication Data

US 2023/0131404 A1  Apr. 27, 2023

Related U.S. Application Data

(63) Continuation of application No. PCT/KR2022/012226, filed on Aug. 17, 2022.

(30) Foreign Application Priority Data

Oct. 22, 2021  (KR) .......................... 10-2021-0142133

(51) Int. Cl.
*G06K 9/00* (2022.01)
*G06T 7/20* (2017.01)
(Continued)

(52) U.S. Cl.
CPC .................. *G06T 7/70* (2017.01); *G06T 7/20* (2013.01); *G06T 7/50* (2017.01); *G06V 10/25* (2022.01);
(Continued)

(58) Field of Classification Search
None
See application file for complete search history.

(56) References Cited

U.S. PATENT DOCUMENTS 7,590,262 B2    9/2009  Fujimura et al.
9,201,425 B2   12/2015  Yoon et al.
(Continued)

FOREIGN PATENT DOCUMENTS

CN         108830179 A     11/2018
KR     10-2016-0078082 A    7/2016
(Continued)

OTHER PUBLICATIONS

Tang et al., "Hand tracking and pose recognition via depth and color information" (Year: 2012).*

(Continued)

*Primary Examiner* — SJ Park
(74) *Attorney, Agent, or Firm* — Jefferson IP Law, LLP

(57) ABSTRACT

An electronic apparatus is provided. The electronic apparatus includes a first sensor configured to obtain a color image, a second sensor configured to obtain a depth image, a memory storing a neural network model, and a processor configured to, based on a first color image being received from the first sensor, obtain a first region of interest by inputting the first color image to the neural network model, and identify whether a distance between an object included in the first region of interest and the electronic apparatus is less than a threshold distance.

18 Claims, 10 Drawing Sheets

(51) Int. Cl.
  *G06T 7/50* (2017.01)
  *G06T 7/70* (2017.01)
  *G06V 10/25* (2022.01)
  *G06V 10/74* (2022.01)
  *G06V 10/82* (2022.01)

(52) U.S. Cl.
  CPC ............ *G06V 10/761* (2022.01); *G06V 10/82* (2022.01); *G06T 2207/10024* (2013.01); *G06T 2207/30196* (2013.01)

(56) References Cited

U.S. PATENT DOCUMENTS

| | | | |
|---|---|---|---|
| 9,247,211 B2 | 1/2016 | Zhang et al. | |
| 9,460,339 B2 | 10/2016 | Litvak et al. | |
| 9,639,951 B2 | 5/2017 | Salahat et al. | |
| 9,729,865 B1 | 8/2017 | Kuo et al. | |
| 10,761,538 B2 | 9/2020 | Ball et al. | |
| 10,984,543 B1 | 4/2021 | Srinivasan | |
| 11,417,007 B2 | 8/2022 | Kang et al. | |
| 11,605,244 B2 | 3/2023 | Lee et al. | |
| 11,734,910 B2 | 8/2023 | Mithun et al. | |
| 2011/0211754 A1* | 9/2011 | Litvak | G06V 40/107 382/165 |
| 2017/0154471 A1* | 6/2017 | Woo | G06F 3/011 |
| 2017/0200044 A1 | 7/2017 | Lee et al. | |
| 2017/0372479 A1* | 12/2017 | Somanath | G06T 7/11 |
| 2020/0050839 A1 | 2/2020 | Wolf et al. | |
| 2020/0118988 A1 | 4/2020 | Yueh et al. | |
| 2020/0380251 A1 | 12/2020 | Lee et al. | |
| 2021/0150746 A1 | 5/2021 | Kang et al. | |
| 2022/0335252 A1* | 10/2022 | Georgievskaya | G06N 3/088 |
| 2023/0251744 A1* | 8/2023 | Peuhkurinen | G06F 3/03543 345/158 |

FOREIGN PATENT DOCUMENTS

| | | |
|---|---|---|
| KR | 10-2018-0108123 A | 10/2018 |
| KR | 10-2021-0061839 A | 5/2021 |
| KR | 10-2565823 B1 | 8/2023 |

OTHER PUBLICATIONS

International Search Report and Written Opinion dated Dec. 13, 2022, issued in International Application No. PCT/KR2022/012226.

XP 034051341, Pallet detection and docking strategy for autonomous pallet truck AGV operation, Sep. 27, 2021.

XP 033251277, Deep Detection of People and their Mobility Aids for a Hospital Robot, Sep. 6, 2017.

European Search Report dated Oct. 4, 2024, issued in European Application No. 22883739.9.

* cited by examiner

ELECTRONIC APPARATUS FOR REAL-TIME HUMAN DETECTION AND TRACKING SYSTEM AND CONTROLLING METHOD THEREOF

CROSS-REFERENCE TO RELATED APPLICATION(S)

This application is a continuation application, claiming priority under § 365(c), of an International application No. PCT/KR2022/012226, filed on Aug. 17, 2022, which is based on and claims the benefit of a Korean patent application number 10-2021-0142133, filed on Oct. 22, 2021, in the Korean Intellectual Property Office, the disclosure of which is incorporated by reference herein in its entirety.

TECHNICAL FIELD

The disclosure relates to an electronic apparatus and a control method thereof. More particularly, the disclosure relates to an electronic apparatus including a sensor and a control method thereof.

BACKGROUND ART

Recently, various types of electronic apparatuses are being developed and distributed along with development of electronic technologies.

More particularly, the disclosure relates to a fixed image recognition system such as closed-circuit television (CCTV) may recognize a person easily, since the person and the system are spaced apart from each other by a certain distance or longer.

In contrast, in a case of a movable image recognition system such as a robot, a distance between the person and the system may get very short frequently, and the system may not easily recognize the person in such a case.

For example, when the person approaches so as to almost cover a camera provided in the system, the system may not recognize the person and a probability of failure of tracking for the person is large, since an image obtained by the system does not include feature points capable of identifying the person.

If the system fails tracking the person, there is a problem that suitable response in various situations such as travelling path adjustment, travelling stopping, and the like of the system is not able to be performed. Therefore, an apparatus and a method for suitably recognizing and tracking a person in various situations have been required.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide an electronic apparatus which tracks an object and a control method thereof.

Additional aspects will be set forth in part in the description which follows and, in part, will be apparent from the description, or may be learned by practice of the presented embodiments.

Technical Solution

In accordance with an aspect of the disclosure, an electronic apparatus is provided. The electronic apparatus includes a first sensor configured to obtain a color image, a second sensor configured to obtain a depth image, a memory storing a neural network model, and a processor configured to, based on a first color image being received from the first sensor, obtain a first region of interest by inputting the first color image to the neural network model, and identify whether a distance between an object included in the first region of interest and the electronic apparatus is less than a threshold distance, in which the processor is configured to, based on the identified distance being less than the threshold distance, identify a first region including pixels including depth information less than the threshold distance among a plurality of pixels included in a first depth image corresponding to the first color image, obtain intersection information between the first region of interest and the first region, and based on the obtained intersection information being a threshold value or more, identify that the first region includes the object.

The processor may be configured to identify a second region including pixels including depth information less than the threshold distance in a second depth image corresponding to a second color image received from the second sensor, obtain intersection information between the first region and the second region, based on the obtained intersection information being the threshold value or more, identify that the second region includes the object, and track a position of the object based on the first region and the second region.

The processor may be configured to, based on the obtained intersection information being the threshold value or more, obtain a first merged region in which the first region of interest and the first region are merged, identify a second region including pixels including depth information less than the threshold distance in a second depth image corresponding to a second color image received from the second sensor, obtain intersection information between the first merged region and the second region, based on the obtained intersection information being the threshold value or more, identify that the second region includes the object, and track a position of the object based on the first merged region and the second region.

The processor may be configured to, based on a proportion of pixels including depth information less than the threshold distance in the second depth image being a threshold proportion or more, identify the second region including pixels including depth information less than the threshold distance among a plurality of pixels included in the second depth image.

The processor may be configured to input a second color image received from the first sensor to the neural network model, and based on a region of interest being not identified in the second color image based on an output of the neural network model, identify the second region including the pixels including the depth information less than the threshold distance in the second depth image corresponding to the second color image.

The processor may be configured to, based on a proportion of pixels including the depth information less than the threshold distance in the second depth image being less than a threshold proportion, obtain a second region of interest including the object by inputting the second color image to the neural network model, identify whether a distance between the object included in the second region of interest and the electronic apparatus is less than a threshold distance, based on the identified distance being less than the threshold distance, identify the second region including the pixels including the depth information less than the threshold distance among a plurality of pixels included in the second depth image, obtain intersection information between the second region of interest and the second region, and based on the obtained intersection information being a threshold value or more, identify that the second region includes the object.

The processor may be configured to, based on the identified distance being the threshold distance or more, track a position of the object based on the first region of interest, the first region, and the second region of interest.

The processor may be configured to, based on the identified distance being the threshold distance or more, identify a position of the object based on the first region of interest.

The first sensor may include at least one of a camera or a red, green, and blue (RGB) color sensor, and the second sensor may include at least one of a stereo vision sensor, a Time-of-Flight (ToF) sensor, or a light detection and ranging (LiDAR) sensor.

In accordance with another aspect of the disclosure, a method for controlling an electronic apparatus is provided. The method includes based on a first color image being received from a first sensor, obtaining a first region of interest by inputting the first color image to a neural network model, and identifying whether a distance between an object included in the first region of interest and the electronic apparatus is less than a threshold distance, in which the identifying includes, based on the identified distance being less than the threshold distance, identifying a first region including pixels including depth information less than the threshold distance among a plurality of pixels included in a first depth image corresponding to the first color image, obtaining intersection information between the first region of interest and the first region, and based on the obtained intersection information being a threshold value or more, identifying that the first region includes the object.

The control method may further include identifying a second region including pixels including depth information less than the threshold distance in a second depth image corresponding to a second color image received from the second sensor, obtaining intersection information between the first region and the second region, based on the obtained intersection information being the threshold value or more, identifying that the second region includes the object, and tracking a position of the object based on the first region and the second region.

The control method may further include, based on the obtained intersection information being the threshold value or more, obtaining a first merged region in which the first region of interest and the first region are merged, identifying a second region including pixels including depth information less than the threshold distance in a second depth image corresponding to a second color image received from the second sensor, obtaining intersection information between the first merged region and the second region, based on the obtained intersection information being the threshold value or more, identifying that the second region includes the object, and tracking a position of the object based on the first merged region and the second region.

The identifying the second region may include, based on a proportion of pixels including depth information less than the threshold distance in the second depth image being a threshold proportion or more, identifying the second region including pixels including depth information less than the threshold distance among a plurality of pixels included in the second depth image.

The control method may further include inputting a second color image received from the first sensor to the neural network model, and the identifying the second region may include, based on a region of interest being not identified in the second color image based on an output of the neural network model, identifying the second region including the pixels including the depth information less than the threshold distance in the second depth image corresponding to the second color image.

The control method may further include, based on a proportion of pixels including the depth information less than the threshold distance in the second depth image being less than a threshold proportion, obtaining a second region of interest including the object by inputting the second color image to the neural network model, and identifying whether a distance between the object included in the second region of interest and the electronic apparatus is less than a threshold distance, the identifying the second region may include, based on the identified distance being less than the threshold distance, identifying the second region including the pixels including the depth information less than the threshold distance among a plurality of pixels included in the second depth image, and the control method may further include obtaining intersection information between the second region of interest and the second region, and based on the obtained intersection information being a threshold value or more, identifying that the second region includes the object.

The tracking may include, based on the identified distance being the threshold distance or more, tracking a position of the object based on the first region of interest, the first region, and the second region of interest.

The control method may further include, based on the identified distance being the threshold distance or more, identifying a position of the object based on the first region of interest.

The first sensor may include at least one of a camera or an RGB color sensor, and the second sensor may include at least one of a stereo vision sensor, a ToF sensor, or a LiDAR sensor.

Effect of Invention

According to various embodiments of the disclosure, it is possible to track the object.

Particularly, it is possible to identify and track the object in various situations such as case where the object and the electronic apparatus are suitably spaced apart, close to each other, very close to each other, and the like.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
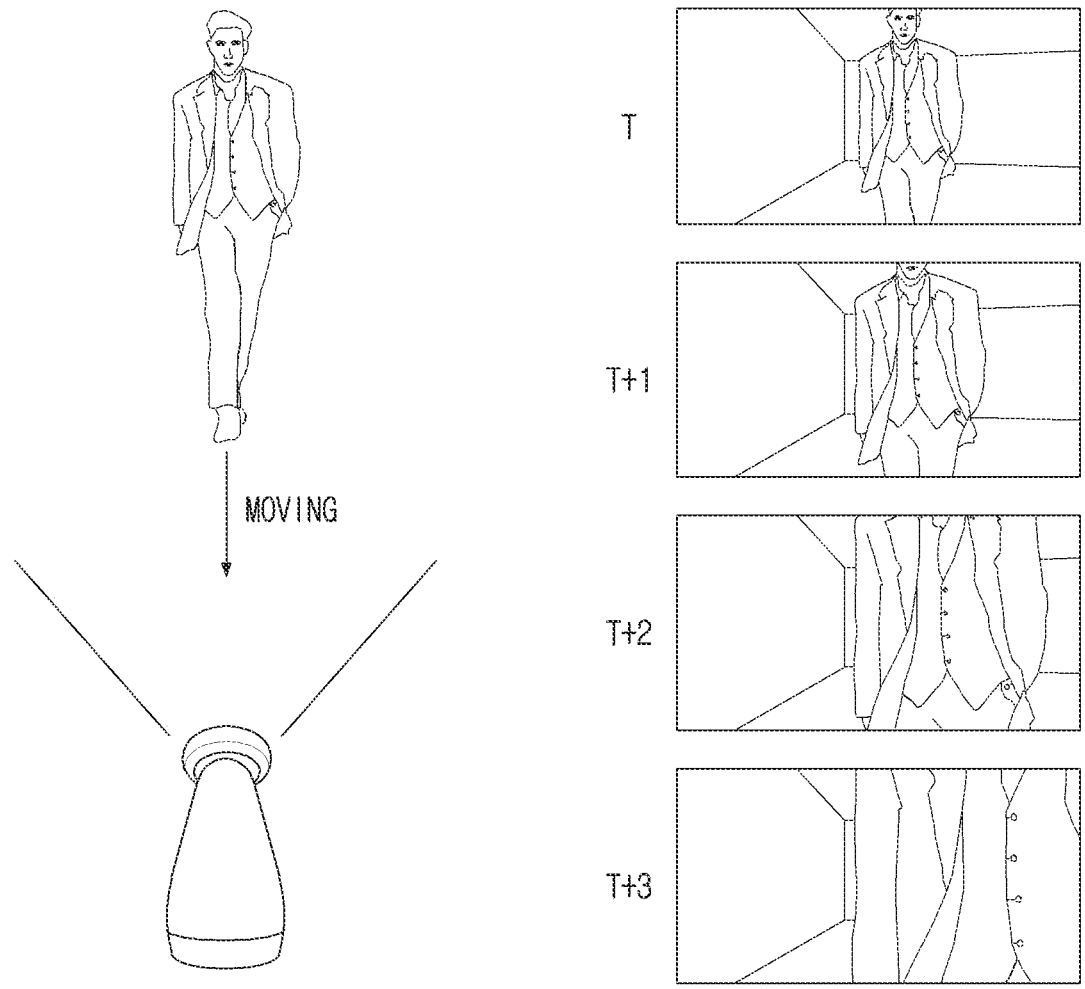
FIG. 1 is a diagram illustrating an electronic apparatus which identifies an object according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used in embodiments of the disclosure have been selected as widely used general terms as possible based on functions in the disclosure, but these may vary in accordance with the intention of those skilled in the art, the precedent, the emergence of new technologies and the like.

In addition, in a certain case, there may also be an arbitrarily selected term, in which case the meaning will be described in the description of the disclosure. Therefore, the terms used in the disclosure should be defined based on the meanings of the terms themselves and the contents throughout the disclosure, rather than the simple names of the terms.

The embodiments of the disclosure may be variously changed and include various embodiments, and specific embodiments will be shown in the drawings and described in the description. However, it should be understood that this is not to limit the scope of the specific embodiments and all modifications, equivalents, and/or alternatives included in the disclosed spirit and technical scope are included. In describing the disclosure, a detailed description of the related art may be omitted when it is determined that the detailed description may unnecessarily obscure a gist of the disclosure.

The terms "first," "second," or the like may be used for describing various elements but the elements may not be limited by the terms. The terms are used only to distinguish one element from another.

It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof.

A term such as "module" or "unit" in the embodiment executes at least one function or operation and may be implemented as hardware, software, or a combination of hardware and software. Further, except for when each of a plurality of "modules", "units", and the like needs to be realized in an individual hardware, the components may be integrated in at least one module and be implemented in at least one processor (not illustrated).

Hereinafter, with reference to the accompanying drawings, embodiments of the disclosure will be described in detail for those skilled in the art to easily practice the embodiments. But, the disclosure may be implemented in various different forms and is not limited to the embodiments described herein. In addition, in the drawings, the parts not relating to the description are omitted for clearly describing the disclosure, and the same reference numerals are used for the same parts throughout the specification.

FIG. 1 is a diagram illustrating an electronic apparatus which identifies an object according to an embodiment of the disclosure.

The electronic apparatus according to an embodiment of the disclosure may be implemented as various types of devices such as a user terminal device, a display apparatus, a set-top box, a table personal computer (PC), a smartphone, an e-book reader, a desktop PC, a lap top PC, a workstation, a server, a personal digital assistant (PDA), a portable multimedia player (PMP), an a moving picture experts group (MPEG) audio layer-3 (MP3) player, a Kiosk, and the like. However, this is merely an embodiment, and an electronic apparatus 100 may be implemented as various types of electronic apparatuses such as a wearable device corresponding to at least one type of an accessory type (e.g., a watch, a ring, a bracelet, an ankle bracelet, a necklace, a pair of glasses, a contact lens or a head-mounted-device (HMD)) or a fabric or a garment-embedded type (e.g.: electronic cloth), a robot including a driving unit, a projector, a server, and the like.

The electronic apparatus according to an embodiment of the disclosure may be implemented as a robot. Herein, the robot may refer to a machine in various forms having ability to perform one function by itself. In an example, the robot may refer to a smart machine which detects a surrounding environment in real time based on a sensor, a camera, or the like and collect information to operate autonomously.

The robot according to an embodiment may be provided with a driving unit including an actuator or a motor. For example, the robot may control movement of an articulated joint of the robot using the driving unit. Herein, the driving unit may include a wheel, a brake, and the like and the robot may be implemented as a movable robot which is able to move inside a specific space by itself using the driving unit. In addition, the robot joint may refer to a constituent element of the robot for replacing the function of person's arm or hand.

The robots may be divided into industrial robots, medical robots, domestic robots, military robots, exploration robots, and the like according to fields or functions that the robots are able to perform. According to an embodiment, the industrial robots may be more specifically divided into robots used in a product manufacturing process in a factory, robots for taking care for a customer, taking an order, and serving in a store or a restaurant, and the like. However, these are merely examples, and the robot may be classified variously according to a utilization field, a function, and a usage object, and are not limited to the above examples.

Hereinafter, for convenience of description, the electronic apparatus will be described by assuming the electronic apparatus as a robot.

Referring to FIG. 1, the electronic apparatus may include a sensor and detect an object located around (e.g., at least one of front part, rear part, or side part of) the electronic apparatus using the sensor. For example, the sensor may be implemented as a camera, and the camera may capture a still image at a specific time point and may also capture still images continuously. The electronic apparatus may identify an object located around the electronic apparatus or adjacent to the electronic apparatus based on the image obtained through the sensor. Herein, the object may include a person, an obstacle, and the like, and the obstacle may refer to various objects or situations that may be located in a travelling direction of the electronic apparatus thereby obstructing the travelling of the electronic apparatus, or may cause stop of driving during travelling of the electronic apparatus, damage, or failure. For example, when the electronic apparatus travels a specific space in a house, the obstacle may include furniture, an electronic device, walls, stairs, door sill, a person, a pet, or the like.

Particularly, referring to FIG. 1, an electronic apparatus 100 may identify and track an object based on images obtained by the sensor at intervals of certain time.

Referring to FIG. 1, images obtained at a time point T and a time point T+1 may be easy for the electronic apparatus to identify the object (e.g., person), but images obtained at a time point T+2 and a time point T+3 may not be easy for the electronic apparatus to identify the object.

For example, at the time points T+2 and T+3, the person and the electronic apparatus are very close to each other, and accordingly, the images obtained at the time points T+2 and T+3 may not include an area capable of identifying a person by the electronic apparatus or may identify a person with a very low accuracy (or reliability). In this case, the electronic apparatus may fail to track the object (e.g., person) and this may cause various problems that the electronic apparatus is not able to correct a travelling path or a probability of collision of the electronic apparatus and the object increases.

Hereinafter, various embodiment of easily identifying the object even in a case where the image obtained through the sensor does not include the area for identifying the object since the electronic apparatus and the corresponding object are very close to each other, will be described.

Figure 2:
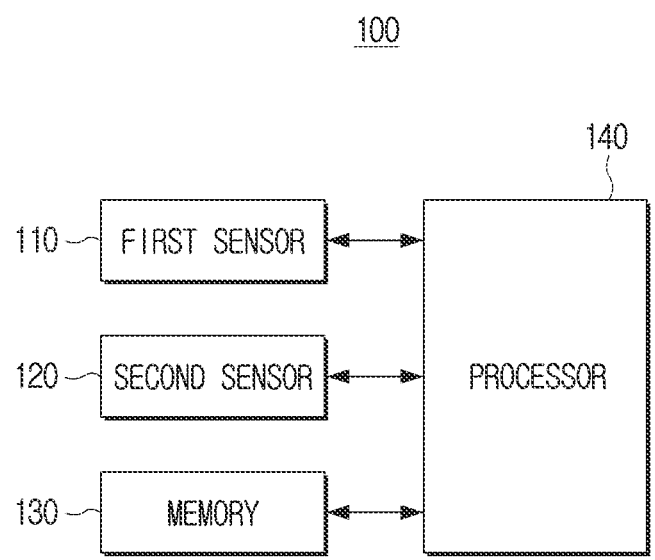
FIG. 2 is a block diagram illustrating a configuration of the electronic apparatus according to an embodiment of the disclosure.

FIG. 2 is a block diagram illustrating a configuration of the electronic apparatus according to an embodiment of the disclosure.

Referring to FIG. 2, an electronic apparatus 100 according to an embodiment of the disclosure may include a first sensor 110, a second sensor 120, a memory 130, and a processor 140.

The first sensor 110 according to an embodiment may obtain a color image.

In an example, the first sensor 110 may include at least one of a camera or a red/green/blue (RGB) color sensor. Herein, the camera is a constituent element for capturing a still image or a moving image. The camera may capture a still image at a specific time point or capture still images continuously.

In an example, the electronic apparatus 100 may obtain a color image of a part ahead of the electronic apparatus 100 through a camera which is an implementation example of the first sensor 110, and identify an object located in front of the electronic apparatus 100 based on the obtained color image.

According to an embodiment, the second sensor 120 may obtain a depth image.

In an example, the second sensor 120 may include at least one of a Time-of-Flight (ToF) sensor, a light detection and ranging (LiDAR) sensor, a Radar, or sensor.

For example, the second sensor 120 may be implemented as an ultrasonic sensor, an infrared sensor, or the like. According to an embodiment, when the second sensor 120 is implemented as an ultrasonic sensor, the electronic apparatus 100 may control so that the ultrasonic sensor emits ultrasonic pulses. Then, when a reflected wave obtained by reflection of the ultrasonic pulse by an object is received, the electronic apparatus 100 may measure time elapsed during the above process and measure a distance between the object and the electronic apparatus 100. In addition, the ultrasonic sensor may be implemented in various forms by including an ultrasonic proximity sensor. The infrared sensor is an element which detects infrared light information of the object. The electronic apparatus 100 may identify the object or measure the distance between the object and the electronic apparatus 100 based on the infrared light information obtained through the infrared sensor.

Meanwhile, according to an embodiment, the electronic apparatus 100 may include the first sensor 110 for obtaining a color image and the second sensor 120 for obtaining a depth image as separate constituent elements or may also include those as one constituent element. For example, the electronic apparatus may include an RGB-depth (RGB-D) camera capable of obtaining both the color image and the depth image and may obtain the color image and a depth image through the RGB-D camera.

The memory 130 is a constituent element for variably storing various pieces of information related to the function of the electronic apparatus 100. For example, the memory 130 may be implemented as a non-volatile memory such as a hard disk, a solid state drive (SSD), or a flash memory (e.g., NOR or NAND-type flash memory).

The memory 130 may store one or more artificial intelligence models. Specifically, the memory 130 according to the disclosure may store a neural network model trained to identify a region of interest in an image. In addition, the neural network model stored in the memory 130 may be a model trained to identify an object in the region of interest. Herein, the neural network model may be a model trained using a color image and may be a model trained to identify the region of interest including an object using a plurality of sample color images.

The neural network model according to an embodiment may be a determination model trained based on a plurality of images based on an artificial intelligence algorithm and may be a model based on a neural network. The trained determination model may be designed to simulate a brain structure of human on a computer and may include a plurality of network nodes having weights and simulating neurons of the neural network of human. The plurality of network nodes may form connections to each other to simulate a synaptic activity in that the neurons transmit and receive signals through synapse. In addition, the trained determination model may include, for example, a machine learning model, a neural network model, or a deep learning model developed from the neural network model. In a deep learning model, a plurality of network nodes may be positioned at depths (or on layers) different from each other and may transmit and receive data according to the convolution connection.

For example, the neural network may be a trained convolution neural network (CNN). The CNN is a multilayer neural network having a particular connection structure conceived for speech processing, image processing, or the like. Meanwhile, the neural network model is not limited to the CNN. For example, the neural network model may be implemented as at least one deep neural network (DNN) model of a Recurrent Neural Network (RNN), Long Short-Term Memory Network (LSTM), Gated Recurrent Units (GRU), or Generative Adversarial Networks (GAN).

The processor 140 according to an embodiment may control general operations of the electronic apparatus 100.

According to an embodiment, the processor 140 may be implemented as a digital signal processor, a microprocessor, an artificial intelligence (AI) processor, and a time controller (T-CON) for processing digital image signals.

However, there is no limitation thereto, and the processor may include one or more of a central processing unit (CPU), a microcontroller unit (MCU), a micro processing unit (MPU), a controller, an application processor (AP), or a communication processor (CP), and an ARM processor or may be defined as the corresponding term. In addition, the processor 140 may be implemented as System on Chip (SoC) or large scale integration (LSI) including the processing algorithm or may be implemented in form of a field programmable gate array (FPGA).

Particularly, the processor 140 may identify a position of an object adjacent to the electronic apparatus 100 and track a position change of the object based on at least one of a color image received through the first sensor 110 and a depth image received through the second sensor 120.

This will be described in detail with reference to FIG. 3.

Figure 3:
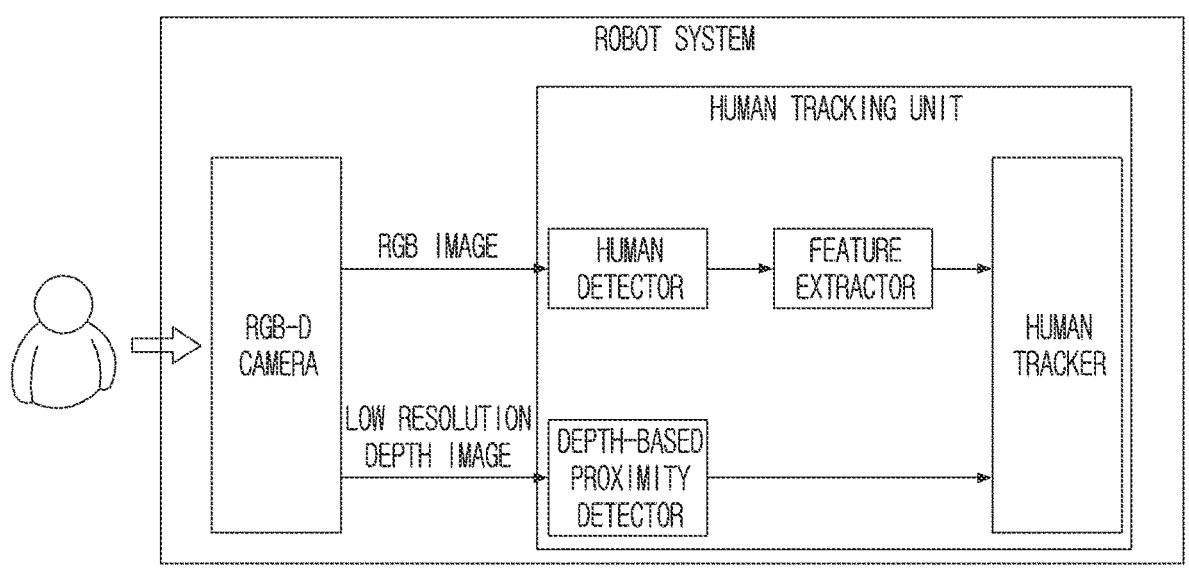
FIG. 3 is a block diagram illustrating operations of a first sensor and a second sensor according to an embodiment of the disclosure.

FIG. 3 is a block diagram illustrating operations of a first sensor and a second sensor according to an embodiment of the disclosure.

Referring to FIG. 3, a first sensor 110 provided in the electronic apparatus 100 may obtain a color image, for example, an RGB image. In addition, the second sensor 120 may obtain a depth image, for example, a depth image having a low resolution.

As described above, the electronic apparatus 100 may include each of the first sensor 110 and the second sensor 120 or may include one sensor (e.g., RGB-D sensor) and obtain each of the color image and the depth image using this.

First, the processor 140 may obtain a first region of interest by inputting a first color image received from the first sensor 110 to a neural network model. The neural network model herein may be a model trained to identify a region of interest (ROI) or a candidate region which is a region predicted to include an object in an image based on a plurality of pieces of sample data. Herein, the object may include a human or an animal (e.g., pet) close to the electronic apparatus 100.

However, this is merely an example and the object may be variously changed according to the purpose of the neural network model, a plurality of sample images used in the training, and the like.

The neural network model according to an embodiment may be a model trained to identify a region of an image predicted to include an object, a region in which a movement occurs, a region in which a change of color or luminance occurs, and the like as the region of interest. For example, the neural network model may identify, based on one image, a region predicted to include an object in the corresponding image as the region of interest, and may also identify a region in which a pixel value is changed by comparing a first color image preceding in chronological sequence and the following second color image and identify the identified region as the region of interest predicted to include the object. However, the above example is merely an embodiment and the neural network model may be trained to identify a region predicted to include the object in the image as the region of interest through various training methods.

According to an embodiment of the disclosure, when a first depth image is received from the second sensor 120, the processor 140 may identify a first region including pixels including depth information less than a threshold distance among a plurality of pixels included in the first depth image.

For example, a depth image obtained by the second sensor 120 may include distance information between the second sensor 120 and an object located in front of the second sensor 120.

For example, when the second sensor 120 is implemented as a ToF sensor, the ToF sensor may measure a distance to an object by measuring time during which light emitted from a light emission unit provided in the ToF sensor is reflected by an object located in adjacent to the electronic apparatus 100 and received by a light receiving unit. Herein, the light emitting unit may be implemented as, for example, an IR light source which emits infrared light modulated to a signal at a specific frequency and the light receiving unit may be implemented as, for example, an image sensor which receives light reflected by an object. However, these are merely examples, the light emitting unit may be implemented as various light sources capable of emitting light such as ultrasonic light or laser, and the light receiving unit may be implemented as various light receiving sensors capable of receiving light such as an RGB sensor.

As another example, the second sensor 120 may be implemented as a stereo vision camera and obtain distance information to an object, that is, depth information using binocular disparity feature in that the object is captured differently through the stereo vision camera.

According to an embodiment, each of a plurality of pixels constituting the depth image obtained by the second sensor 120 may include depth information (or distance information) which expresses the distance to the corresponding object as a numerical value. For example, a first pixel of the plurality of pixels may include depth information which represents a distance to an object (e.g., person) corresponding to the first pixel (e.g., located in front area) as a numerical value, and a second pixel may include depth information which represents a distance to an object (e.g., wall) corresponding to the second pixel (e.g., located in front area) as a numerical value. Herein, the unit of the depth information may be cm, but this is merely an example and the various forms of unit capable of expressing the distance may be used.

For example, the depth information may be expressed as a value of 0 to 1, where 0 corresponds to a minimum distance in a distance range that is able to be sensed by the second sensor 120 and 1 corresponds to a maximum distance in a distance range that is able to be sensed by the second sensor 120.

According to an embodiment, the processor 140 may identify a first region including pixels including the depth information less than a threshold distance among the plurality of pixels included in the first depth image corresponding to the first color image. Herein, the first depth image corresponding to the first color image may refer to a depth image obtained at the same time point as the first color image.

In addition, the threshold distance (e.g., 1 m or the like) may refer to an arbitrary distance which is set by a user or a manufacturer of the electronic apparatus 100 to determine that it is close to the electronic apparatus 100.

The processor 140 according to an embodiment of the disclosure may identify the distance to the object located in front of the electronic apparatus 100 using at least one of the color image obtained through the first sensor 110 and the depth image obtained through the second sensor 120.

Herein, the electronic apparatus 100 may be implemented as a movable robot or an autonomous vehicle that is able to move a specific space by itself, and when it is determined that an obstacle is in front of the electronic apparatus, the electronic apparatus 100 may adjust a movement path of the electronic apparatus 100.

For example, when it is determined that a specific object, for example, a person is in front of the electronic apparatus, the electronic apparatus 100 may stop moving or move to the right, left, or back and travel by avoiding the person. As another example, when it is determined that a person is in front of the electronic apparatus, the electronic apparatus 100 may provide a video or audio alarm notifying that interaction with the electronic apparatus 100 is possible.

Hereinafter, various embodiments, for example, a method for identifying a distance to an object and a method for tracking a position change of an object by the electronic apparatus 100 will be described.

Figure 4:
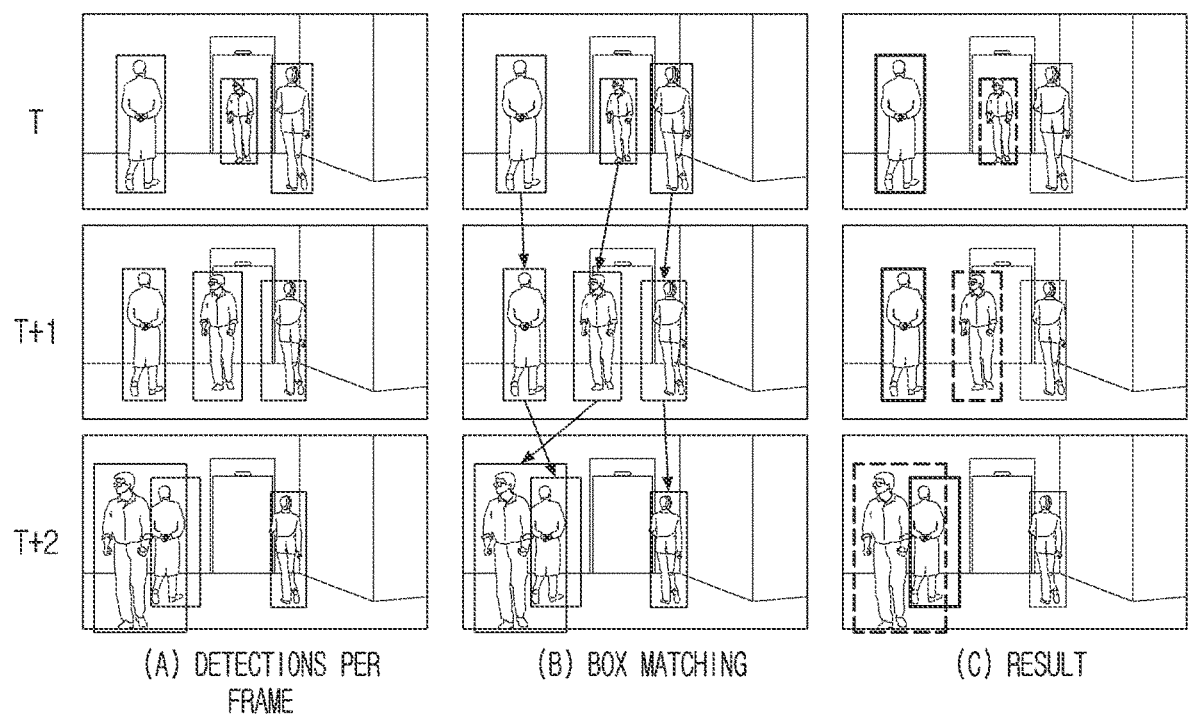
FIG. 4 is a diagram illustrating a method for identifying and tracking an object using a color image according to an embodiment of the disclosure.
Figure 5:
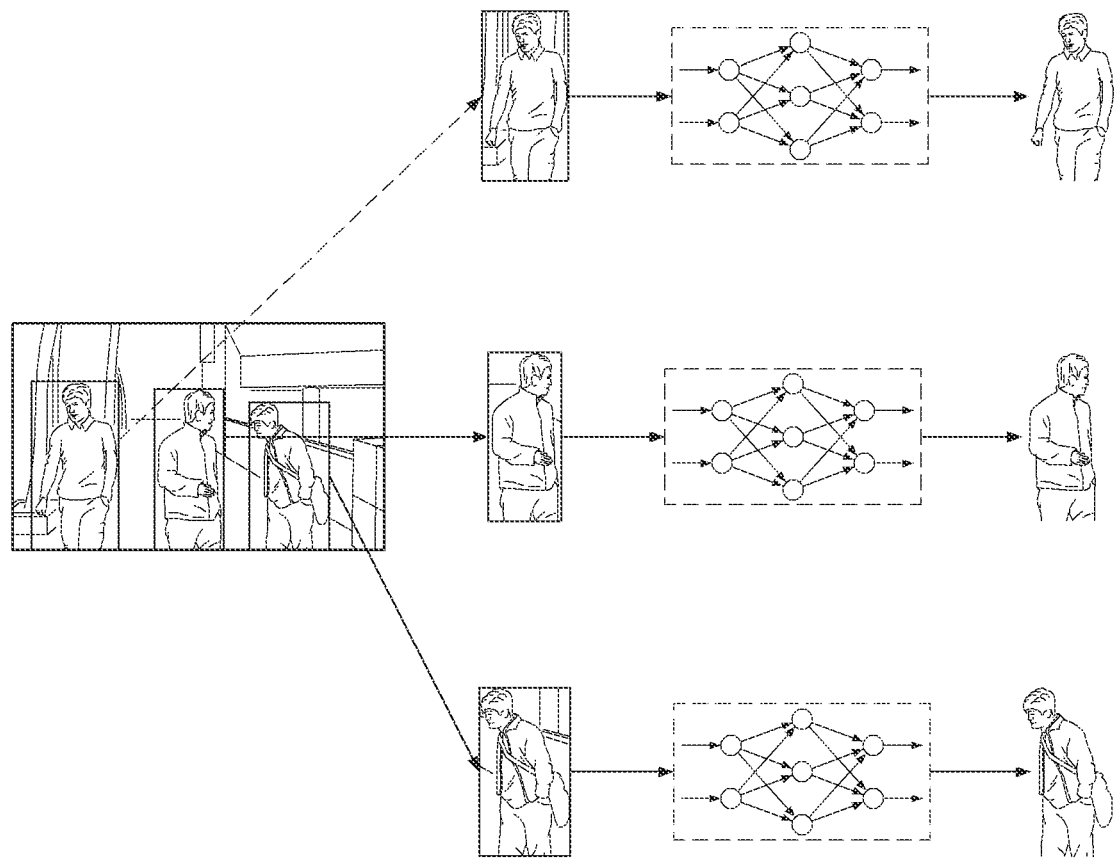
FIG. 5 is a diagram illustrating a method for identifying an object using a color image according to an embodiment of the disclosure.

FIGS. 4 and 5 are diagrams illustrating a method for identifying and tracking an object using a color image according to various embodiments of the disclosure.

First, FIG. 4 is a diagram illustrating a method for identifying a region of interest from the color image by a processor 140 according to an embodiment of the disclosure.

Referring to FIG. 4, the processor 140 may obtain the region of interest by inputting the color image received from the first sensor 110 to the neural network model. For example, the region of interest is a region including a person and shown with a box in FIG. 4.

Time Point T

When a color image corresponding to the time point T is received from the first sensor 110 at the time point T, the processor 140 may obtain the region of interest by inputting the color image to the neural network model.

Time Point T+1

Then, when a color image corresponding to the time point T+1 is received at the time point T+1, the processor 140 may obtain the region of interest by inputting the color image to the neural network model.

Herein, the processor 140 may identify the region of interest including the same object by comparing the region of interest obtained at the time point T with the region of interest obtained at the time point T+1, and track a movement of the corresponding object according to the change from the time point T to the time point T+1.

Time Point T+2

When a color image corresponding to the time point T+2 is received at the time point T+2, the processor 140 may obtain the region of interest by inputting the color image to the neural network model.

Herein, the processor 140 may identify the region of interest including the same object by comparing the region of interest obtained at the time point T+1 with the region of interest obtained at the time point T+2, and track a movement of the corresponding object according to the change from the time point T+1 to the time point T+2.

According to an embodiment, the processor 140 may compare similarities of the regions of interest at each time point, and identify whether the regions of interest include the same object based on the compared result. In another example, the processor 140 may input the region of interest at each time point to the neural network model and identify whether the regions of interest include the same object based on an output result of the neural network model.

Meanwhile, according to the color image illustrated in FIG. 4, the distance between the electronic apparatus 100 and the object is a threshold distance or more, that is, the electronic apparatus 100 and the object are sufficiently spaced apart from each other, and therefore the processor 140 may identify the region of interest including the object with significantly high accuracy (or reliability) based on the color image received from the first sensor 110.

FIG. 5 is a diagram illustrating a method for identifying an object using a color image according to an embodiment of the disclosure.

Referring to FIG. 5, a processor 140 may input the region of interest to the neural network model and identify the object included in the region of interest from the neural network model. For example, the color image may include three regions of interest in total, and the processor may identify objects included in the color images by inputting each of the plurality of regions of interest to the neural network model.

As described above, when the distance between the electronic apparatus 100 and the object is the threshold distance or more, the electronic apparatus 100 may identify the object from the color image easily (that is, with high accuracy).

However, if the object moves or the electronic apparatus 100 moves as the time elapses (e.g., elapses from the time point T+1 to the time point T+2), the distance between the electronic apparatus 100 and the object may be less than the threshold distance at the specific time point, and the electronic apparatus 100 may not identify the object easily from the color image obtained at the specific time point.

Hereinafter, various embodiments in which the electronic apparatus 100 identifies the object easily using the color image and the depth image, even if the distance between the electronic apparatus 100 and the object is less than the threshold distance will be described.

Figure 6:
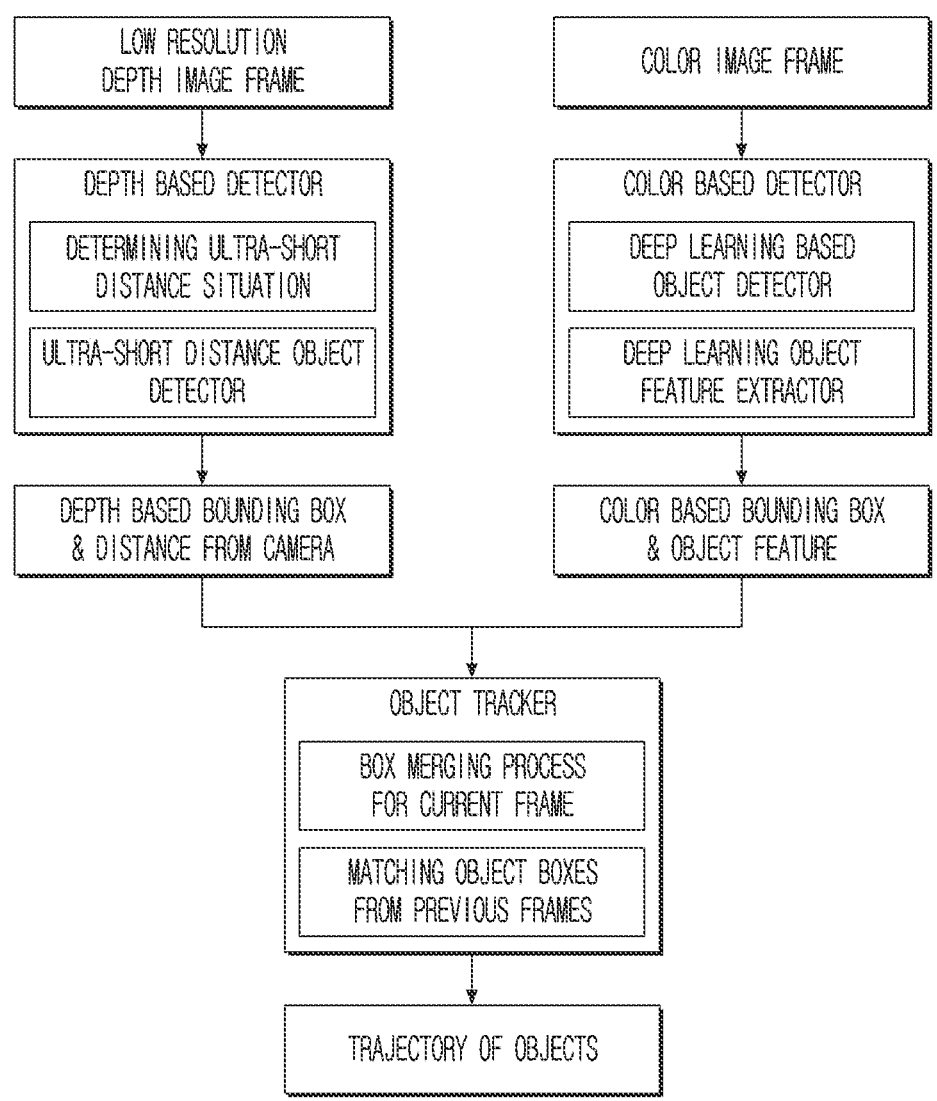
FIG. 6 is a diagram illustrating a method for identifying an object using a color image and a depth image according to an embodiment of the disclosure.

FIG. 6 is a diagram illustrating a method for identifying an object using a color image and a depth image according to an embodiment of the disclosure.

Referring to FIG. 6, a processor 140 according to an embodiment of the disclosure may identify the object located in front of an electronic apparatus 100 using at least one of the color image or the depth image and track the position change of the object.

First, the processor 140 may obtain the first region of interest by inputting the first color image to the neural network model, and identify whether the distance between an object (e.g., person) included in the first region of interest and the electronic apparatus 100 is less than the threshold value.

When the distance between the object and the electronic apparatus 100 is less than the threshold distance, the processor 140 according to an embodiment may identify a first region including pixels including the depth information less than the threshold distance among the plurality of pixels included in the first depth image corresponding to the first color image.

Herein, the first color image may be a color image obtained by the first sensor 110 at a first time point and the first depth image may be a depth image obtained by the second sensor 120 at the first time point.

Then, the processor 140 may obtain intersection information between the first region of interest obtained from the first color image and the first region obtained from the first depth image. When the obtained intersection information is a threshold value or more, the processor 140 may identify that the first area includes an object.

Herein, the intersection information may refer to a value obtained by dividing an area of an intersection region between two regions (e.g., a region of interest obtained from a color image and a region obtained from a depth image) by an area of a combined region of the two regions. For example, when the two regions are the same as each other, the value obtained by dividing the area of the intersection region between the two regions by the area of the combined region of the two regions may be 1. As another example, when the two regions are completely different from each other, the value obtained by dividing the area of the intersection region between the two regions by the area of the combined region of the two regions may be 0. Accordingly, the intersection information have a value of 0 to 1. As the value of the intersection information is large, it may imply that the two regions (e.g., a region of interest obtained from a color image and a region obtained from a depth image) are similar to each other, and as the value of the intersection information is small, it may imply that the two regions are not similar to each other. The intersection information may be referred to as similarity information, but hereinafter, it may be collectively referred to as the intersection information for convenience of description.

Meanwhile, a method and an algorithm for determining whether two regions (e.g., a region of interest obtained from a color image and a region obtained from a depth image) are similar or not similar to each other is not limited to an Intersection over Union (IoU) algorithm as described above, and it is possible to determine whether the two areas are similar to each other using various methods and algorithms.

According to an embodiment, when the first region of interest obtained using the neural network model includes an object and the intersection information between the first region of interest and the first region is the threshold value or more, the processor 140 may identify that the first region also includes the object.

Meanwhile, according to the embodiment described above, the neural network model identified the first region of interest including the object from the first color image and the processor 140 identified that the distance to the object included in the first region of interest is less than the threshold distance. For convenience of description, it is assumed that the object (e.g., person) is located close to the electronic apparatus 100 in this case. According to another example, the object may be located at a long distance (hereinafter, normal distance) or may be located at a very short distance (hereinafter, ultra-short distance) from the electronic apparatus 100.

The processor 140 according to an embodiment may determine whether the distance between the object and the electronic apparatus 100 corresponds to the normal distance or the ultra-short distance. In addition, even when the distance between the object and the electronic apparatus 100 corresponds to the ultra-short distance, the processor 140 may identify the object smoothly and track the position change of the object. This will be described in detail with reference to FIG. 7.

Figure 7:
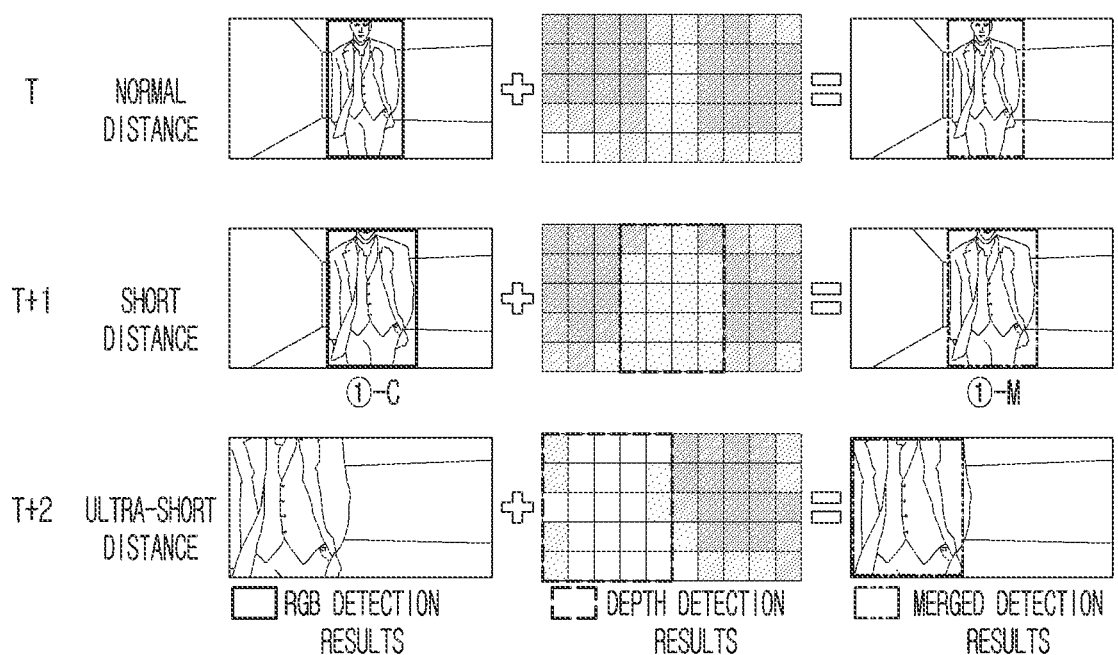
FIG. 7 is a diagram illustrating a method for identifying an object using a depth image according to an embodiment of the disclosure.

FIG. 7 is a diagram illustrating a method for identifying an object using a depth image according to an embodiment of the disclosure.

Distance Between Electronic Apparatus and Object Corresponds to Normal Distance

Referring to FIG. 7, when the first color image is received through the first sensor 110 at the time point T, a processor 140 may obtain the first region of interest including the object by inputting the first color image to the neural network model.

Then, the processor 140 may identify whether the distance between the object and the electronic apparatus 100 is less than the threshold distance.

According to an embodiment, when the identified distance is the threshold distance or more, the processor 140 may identify the position of the object based on the first region of interest.

As described above, when the electronic apparatus 100 and the object are far from each other by a certain distance or more (e.g., threshold distance or more), the processor 140 may obtain the first region of interest including the object using the neural network model and identify the position of the object based on the first region of interest.

In other words, at the time point T, the processor 140 may identify the position of the object without using the first depth image. The processor 140 according to an embodiment may obtain the first region of interest as a first merged region.

Distance Between Electronic Apparatus and Object Corresponds to Short Distance

Referring to FIG. 7, at the time point T+1, when the second color image is received through the first sensor 110, the processor 140 may obtain a second region of interest including the object by inputting the second color image to the neural network model.

Then, the processor 140 may identify whether the distance between the object and the electronic apparatus 100 is less than the threshold distance.

According to an embodiment, when the identified distance is less than the threshold distance, the processor 140 may identify the second region including pixels including the depth information less than the threshold distance among the plurality of pixels included in the second depth image corresponding to the second color image.

Then, the processor 140 may obtain intersection information between the second region of interest and the second region, and identify that the second region includes the object, when the obtained intersection information is the threshold value or more.

When the intersection information between the second region of interest and the second region is threshold value or more, the processor 140 according to an embodiment may obtain a second merged region obtained by merging the second region of interest and the second region. Herein, the merged region may refer to a combined region of two regions.

Herein, when the intersection information has a value of 0 to 1, the threshold value may be a value of 0.7 or the like, and this is merely an example and may be variously changed according to setting of a user or a manufacturer or similarity algorithm.

Then, when the intersection information between the first merged region obtained at the time point T and the second merged region obtained at the time point T+1 is the threshold value or more, the processor 140 may identify that the second merged region includes the object included in the first merged region.

Then, the processor 140 may track the position change of the object according to the time elapse from the time point T to the time point T+1 based on the position of the object identified in the first merged region and the position of the object identified in the second merged region.

In another example, when the intersection information between the second region of interest and the second region is less than the threshold value, the processor 140 may identify that the second region does not include the object included in the second region of interest.

As described above, when the electronic apparatus 100 and the object are far from each other by less than the certain distance (e.g., less than threshold distance), the processor 140 may identify the position of the object based on the region of interest on the color image obtained from the neural network model and the region on the depth image.
Distance Between Electronic Apparatus and Object Corresponds to Ultra-Short Distance Referring to FIG. 7, when a third color image is received through the first sensor 110 at the time point T+2, the processor 140 may input the third color image to the neural network model.

Herein, when the region of interest is not identified from the third color image based on an output of the neural network model, the processor 140 may identify a third region including pixels including depth information less than the threshold distance from a third depth image corresponding to the third color image. The processor 140 according to an embodiment did not obtain the third region of interest from the third color image at the time point T+2 and obtained only the third region from the third depth image, and therefore the processor may obtain the third region as a third merged region.

Then, when the intersection information between the second merged region obtained at the time point T+1 and the third merged region obtained at the time point T+2 is threshold value or more, the processor 140 may identify that the third merged region includes the object included in the second merged region.

Herein, the processor 140 may track the position change of the object according to the time elapse from the time point T+1 to the time point T+2 based on the position of the object identified in the second merged region and the position of the object identified in the third merged region.

Referring to FIG. 7, since the object is very close to the electronic apparatus 100 at the time point T+2, the third color image received from the first sensor 110 may not include feature points (e.g., person's face, arms, legs, or the like) for recognizing the object. Accordingly, if the neural network model does not identify the region of interest from the third color image, the processor 140 may obtain the third region based on the third depth image corresponding to the third color image, set the third region as the third merged region, and identify whether the intersection information between the second merged region obtained at the time point T+1 and the third merged region obtained at the time point T+2 is threshold value or more.

Meanwhile, the processor 140 according to an embodiment may identify a region including pixels including depth information less than the threshold distance from the depth image, regardless of whether the neural network model identifies the region of interest from the color image.

In an example, at the time point T+2, when a proportion of pixels including the depth information less than the threshold distance among the plurality of pixels included in the third depth image is a threshold proportion or more, the processor 140 may identify the third region including pixels including the depth information less than the threshold distance.

For example, when the proportion of pixels including the depth information less than the threshold distance among the plurality of pixels included in the third depth image is 40% or more, the processor 140 may determine that the object is very close to the electronic apparatus and identify the third region including pixels including the depth information less than the threshold distance. Herein, 40% is merely an example and there is no limitation thereto.

Then, the processor 140 may set the third region as the third merged region, and when the intersection between the second merged region obtained at the time point T+1 and the third merged region obtained at the time point T+2 is threshold value or more, the processor 140 may track the position change of the object according to the time elapse from the time point T+1 to the time point T+2 based on the position of the object identified in the second merged region and the position of the object identified in the third merged region.

Meanwhile, when the intersection information between the second merged region obtained at the time point T+1 and the third merged region obtained at the time point T+2 is threshold value or more, the processor 140 may identify that the third merged region does not include the object included in the second merged region.

Figure 8:
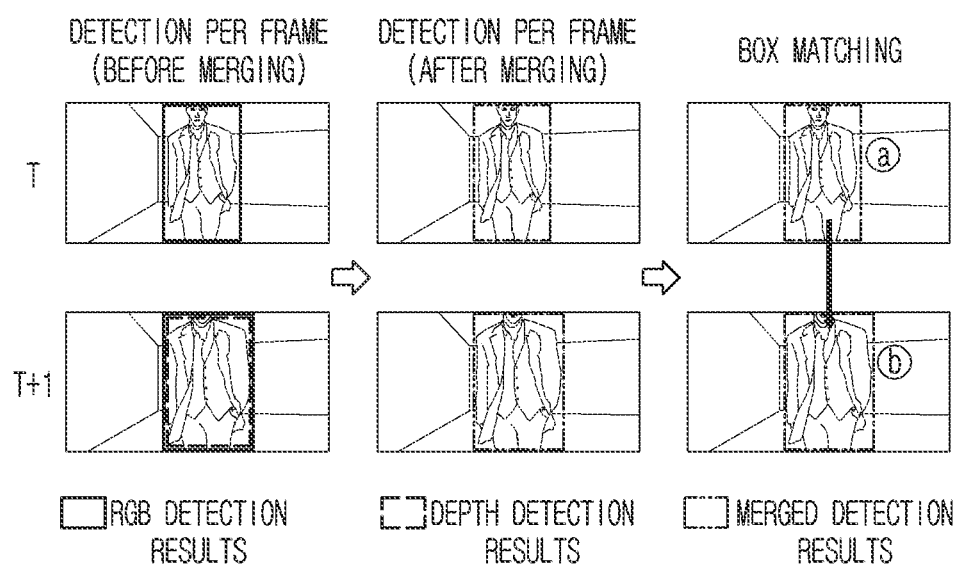
FIG. 8 is a diagram illustrating a merged region according to an embodiment of the disclosure.

FIG. 8 is a diagram illustrating a merged region according to an embodiment of the disclosure.
Time Point T When the first color image is received through the first sensor 110 at the time point T, the processor 140 may obtain the first region of interest including the object by inputting the first color image to the neural network model. Then, the processor 140 may identify whether the distance between the object and the electronic apparatus 100 is less than the threshold distance.

Meanwhile, when the electronic apparatus 100 and the object are far from each other by a certain distance or more (e.g., threshold distance or more), the processor 140 may obtain the first region of interest including the object using the neural network model and identify the position of the object based on the first region of interest.

The processor 140 may identify the position of the object without using the first depth image corresponding to the first color image and obtain the first region of interest identified from the first color image as the first merged region.

Time Point T+1

When the second color image is received through the first sensor 110 at the time point T+1, the processor 140 may obtain the second region of interest including the object by inputting the second color image to the neural network model. Then, the processor 140 may identify whether the distance between the object and the electronic apparatus 100 is less than the threshold distance.

According to an embodiment, when the identified distance is less than the threshold value, the processor 140 may identify the second region based on the second depth image corresponding to the second color image.

Then, the processor 140 may obtain the intersection information between the second region of interest and the second region, and identify that the second region includes the object, when the obtained intersection information is threshold value or more.

Then, when the intersection information between the second region of interest and the second region is the threshold value or more, the processor 140 may obtain the second merged region obtained by merging the second region of interest and the second region. Herein, the merged region may refer to a combined region of two regions.

According to an embodiment, an algorithm for obtaining the intersection information may be an algorithm for obtaining at least one of an Intersection over Union (IoU) value, a distance value of a feature vector, or a depth value.

For example, a first merged region and a second merged region obtained at different time points (e.g., time point T and time point T+1) are defined as Box A and Box B, respectively, and when a cost required for matching the Box A and the Box B is defined as $C_{AB}$, the intersection information may be represented by $C_{AB}$. In addition, the processor 140 may obtain $C_{AB}$ based on the following algorithm.

$$C_{AB}=C(U_{AB},F_A,F_B,D_A,D_B)$$ Equation 1

Herein, $U_{AB}$ represents a value of the Intersection over Union (IoU) of the Box A and Box B, each of $F_A$ and $F_B$ represents a feature vector value, and each of $D_A$ and $D_B$ represent a relative distance from the electronic apparatus 100.

The algorithm for obtaining the intersection information is not limited to the above example, and an algorithm or deep learning of the related art for obtaining the IoU value may be used.

For example, by using an algorithm similar to the algorithm described above, the intersection information between the region of interest and the region obtained at the same time (e.g., time point T+1) may be obtained. For example, a second merged region is defined as Box A, a second merged region is defined as Box B, and when a cost required for matching the Box A and the Box B is defined as $C_{AB}$, the intersection information may be represented by $C_{AB}$.

Figure 9:
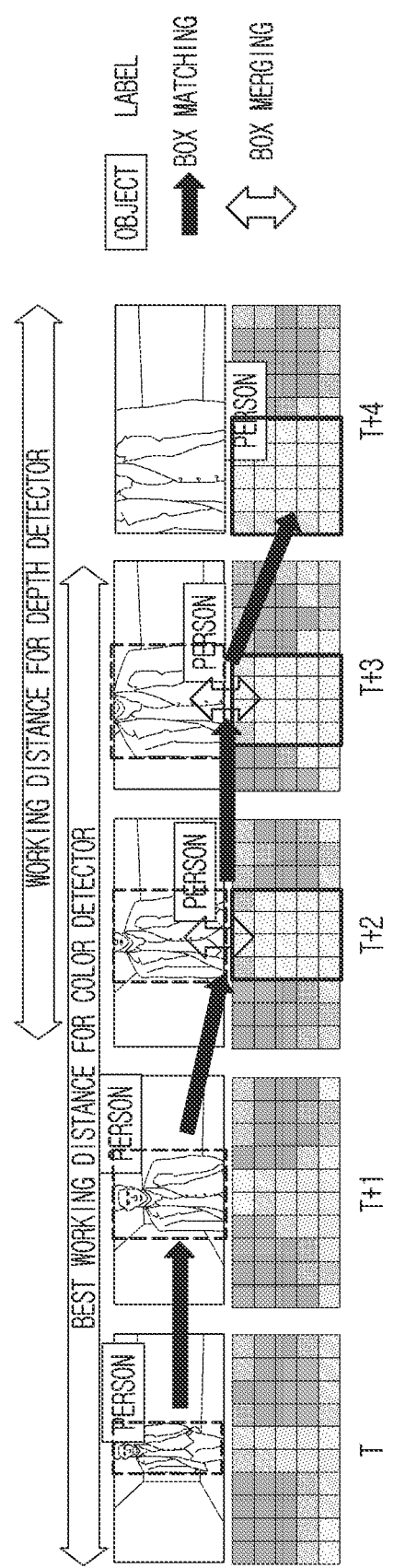
FIG. 9 is a diagram illustrating a distance between the apparatus and an object according to an embodiment of the disclosure.

FIG. 9 is a diagram illustrating a distance between the apparatus and an object according to an embodiment of the disclosure.

Referring to FIG. 9, it is a diagram illustrating that a distance between the object and an electronic apparatus 100 changes according to movement of the object or the electronic apparatus 100 from the time point T and the time point T+4 and illustrating a method that the electronic apparatus 100 identifies and tracks the object at each time point.

Time Point T and Time Point T+1

In an example, the processor 140 may obtain the region of interest by inputting the color image received from the first sensor 110 to the neural network model. Then, the processor 140 may identify an object included in the region of interest and identify a distance between the object and the electronic apparatus 100.

According to an embodiment, when the identified distance is a threshold distance or more, the processor 140 may identify the region of interest as a merged region.

Time Point T+2 and Time Point T+3

In an example, the processor 140 may obtain the region of interest by inputting the color image received from the first sensor 110 to the neural network model. Then, the processor 140 may identify an object included in the region of interest may identify a distance between the object and the electronic apparatus 100.

According to an embodiment, when the identified distance is less than the threshold distance, the processor 140 may identify a region including pixels including depth information less than the threshold distance among a plurality of pixels included in a depth image corresponding to the color image.

Then, the processor 140 may obtain intersection information between the region of interest obtained from the color image and the region obtained from the depth image, and when the intersection information is the threshold value or more, the processor may merge the region of interest and the region and obtain the merged region.

Time Point T+4

In an example, when the color image received from the first sensor 110 is input to the neural network model but the neural network model does not identify the region of interest including the object, the processor 140 may identify the region including pixels including the depth information less than the threshold distance among the plurality of pixels included in the depth image corresponding to the color image.

Then, the processor 140 may obtain the region as the merged region.

Meanwhile, the processor 140 may obtain the intersection information between the merged regions at each of the plurality of time points.

For example, when the intersection information between the merged region obtained at the time point T+1 and the merged region obtained at the time point T is the threshold value or more, the processor 140 may identify that each merged region includes the same object.

In another example, when the intersection information between the merged region obtained at the time point T+3 and the merged region obtained at the time point T+4 is the threshold value or more, the processor 140 may identify that each merged region includes the same object.

Through the method described above, the processor 140 may track the same object using at least one of the color image or the depth image appropriately at each of the time point T to the time point T+4.

Returning to FIG. 2, each of the first sensor 110 and the second sensor 120 may be implemented as an RGB camera, a three-dimensional (3D) camera, or the like. The 3D camera may be implemented as a TOF camera including a Time-of-Flight (TOF) sensor and an infrared light. The 3D camera may include an IR stereo sensor. Each of the first sensor 110 and the second sensor 120 may include a sensor such as a Charge-Coupled Device (CCD), a Complementary Metal-Oxide Semiconductor (CMOS), or the like but is not limited thereto. When each of the first sensor 110 and the second sensor 120 includes the CCD, the CCD may be implemented as a red/green/blue (RGB) CCD, an infrared (IR) CCD, or the like.

The memory 130 may include a read only memory (ROM), a random-access memory (RAM) (e.g., dynamic RAM (DRAM), synchronous DRAM (SDRAM), Double data rate SDRAM (double data rate (DDR) SDRAM)), and the like and may be implemented together with the processor 149 in one chip.

The function related to the artificial intelligence according to the disclosure is operated through the processor 140 and the memory 130. The processor 140 may be formed of one or a plurality of processors. The one or the plurality of processors may be a general-purpose processor such as a CPU, an AP, or a digital signal processor (DSP), a graphic dedicated processor such as a graphics processing unit (GPU) or a vision processing unit (VPU), or an artificial intelligence dedicated processor such as a neural processing unit (NPU), or the like. The one or the plurality of processors may perform control to process the input data according to a predefined action rule stored in the memory 130 or an artificial intelligence model. In addition, if the one or the plurality of processors are artificial intelligence dedicated processors, the artificial intelligence dedicated processor may be designed to have a hardware structure specialized in processing of a specific artificial intelligence model.

The predefined action rule or the artificial intelligence model is formed through training. Being formed through training herein may, for example, imply that a predefined action rule or an artificial intelligence model set to perform a desired feature (or object) is formed by training a basic artificial intelligence model using a plurality of pieces of learning data by a learning algorithm Such training may be performed in a device demonstrating artificial intelligence according to the disclosure or performed by a separate server and/or system. Examples of the learning algorithm include supervised learning, unsupervised learning, semi-supervised learning, or reinforcement learning, but is not limited to these examples.

The artificial intelligence model may include a plurality of neural network layers. The plurality of neural network layers have a plurality of weight values, respectively, and execute neural network processing through a processing result of a previous layer and processing between the plurality of weights. The plurality of weights of the plurality of neural network layers may be optimized by the training result of the artificial intelligence model. For example, the plurality of weights may be updated to reduce or to minimize a loss value or a cost value obtained by the artificial intelligence model during the training process. The artificial neural network may include deep neural network (DNN), and, for example, include a convolutional neural network (CNN), deep neural network (DNN), recurrent neural network (RNN), restricted Boltzmann machine (RBM), deep belief network (DBN), bidirectional recurrent deep neural network (BRDNN), or deep Q-network, but there is no limitation to these examples.

Figure 10:
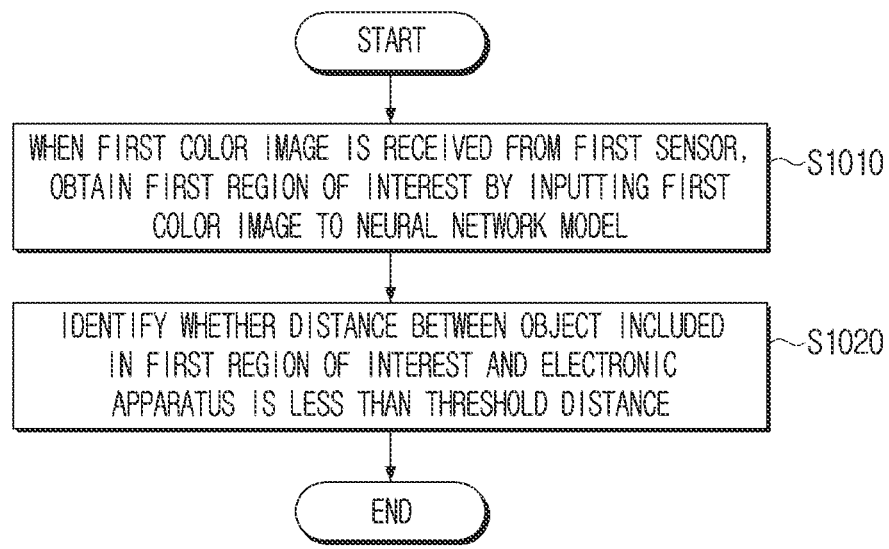
FIG. 10 is a flowchart illustrating a method for controlling the electronic apparatus according to an embodiment of the disclosure.

FIG. 10 is a flowchart illustrating a method for controlling an electronic apparatus according to an embodiment of the disclosure.

Referring to FIG. 10, in a method for controlling the electronic apparatus according to an embodiment for achieving the object of the disclosure, first, when a first color image is received from a first sensor, the first color image is input to a neural network model and a first region of interest is obtained at operation S1010.

Then, the method includes identifying whether a distance between an object included in the first region of interest and the electronic apparatus is less than a threshold distance at operation S1020.

Here, the identifying operation S1020 may include, based on the identified distance being less than the threshold distance, identifying a first region including pixels including depth information less than the threshold distance among a plurality of pixels included in a first depth image corresponding to the first color image, obtaining intersection information between the first region of interest and the first region, and based on the obtained intersection information being a threshold value or more, identifying that the first region includes the object.

The control method according to an embodiment of the disclosure may further include identifying a second region including pixels including depth information less than the threshold distance from a second depth image corresponding to a second color image received from the second sensor, obtaining intersection information between the first region and the second region, based on the obtained intersection information being the threshold value or more, identifying that the second region includes the object, and tracking a position of the object based on the first region and the second region.

In addition, the control method according to an embodiment may include, based on the obtained intersection information being the threshold value or more, obtaining a first merged region the first region of interest and the first region are merged, identifying a second region including pixels including depth information less than the threshold distance from a second depth image corresponding to a second color image received from the second sensor, obtaining intersection information between the first merged region and the second region, based on the obtained intersection information being the threshold value or more, identifying that the second region includes the object, and tracking a position of the object based on the first merged region and the second region.

The identifying the second region may include, based on a proportion of pixels including depth information less than the threshold distance from the second depth image being a threshold proportion or more, identifying the second region including pixels including depth information less than the threshold distance among a plurality of pixels included in the second depth image.

The control method according to an embodiment may further include inputting the second color image received from the first sensor to the neural network model, and the identifying the second region includes, based on a region of interest being not identified in the second color image based on an output of the neural network model, identifying the second region including pixels including depth information less than the threshold distance from a second depth image corresponding to the second color image.

The control method according to an embodiment may further include, based on a proportion of pixels including depth information less than the threshold distance in the second depth image being less than a threshold proportion, obtaining a second region of interest including the object by inputting the second color image to the neural network model, and identifying whether a distance between the object included in the second region of interest and the electronic apparatus is less than the threshold distance, the identifying the second region may include, based on the identified distance being less than the threshold distance, identifying a second region including pixels including depth information less than the threshold distance among a plurality of pixels included in the second depth image, and the control method may further include obtain intersection information between the second region of interest and the second region, and based on the obtained intersection information being a threshold value, identifying that the second region includes the object.

Herein, the tracking may include, based on the identified distance being the threshold distance or more, tracking a position of the object based on the first region of interest, the first region, and the second region of interest.

The control method according to an embodiment may further include, based on the identified distance being the threshold distance or more, identifying a position of the object based on the first region of interest.

The first sensor according to an embodiment of the disclosure may include at least one of a camera or an RGB color sensor, and the second sensor may include at least one of a ToF sensor or a LiDAR sensor.

The embodiments described above may be implemented in a recording medium readable by a computer or a similar device using software, hardware, or a combination thereof. In some cases, the embodiments described in this specification may be implemented as a processor itself. According to the implementation in terms of software, the embodiments such as procedures and functions described in this specification may be implemented as separate software modules. Each of the software modules may perform one or more functions and operations described in this specification.

Computer instructions for executing processing operations of the electronic apparatus 100 according to the embodiments of the disclosure descried above may be stored in a non-transitory computer-readable medium. When the computer instructions stored in such a non-transitory computer-readable medium are executed by the processor of a specific machine, the computer instructions of the electronic apparatus 100 according to various embodiments described above may be executed by the specific machine.

The non-transitory computer-readable medium is not a medium storing data for a short period of time such as a register, a cache, or a memory, but may refer to a medium that semi-permanently stores data and is readable by a machine. Specific examples of the non-transitory computer-readable medium may include a compact disc (CD), a digital versatile disc (DVD), a hard disk drive, a Blu-ray disc, a universal serial bus (USB), a memory card, and a ROM.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
a first sensor configured to obtain a color image;
a second sensor configured to obtain a depth image;
memory storing a neural network model and instructions; and
one or more processors communicatively coupled to the first sensor, second sensor and the memory,
wherein the instructions, when executed by the one or more processors individually or collectively, cause the electronic apparatus to:
based on a first color image being obtained via the first sensor, obtain a first region of interest from the first color image by inputting the first color image to the neural network model,
identify whether a distance between an object included in the first region of interest and the electronic apparatus is less than a threshold distance,
based on the identified distance being less than the threshold distance, identify a first region including pixels including depth information less than the threshold distance among a plurality of pixels included in a first depth image corresponding to the first color image,
obtain intersection information between the first region of interest and the first region,
based on the obtained intersection information being a threshold value or more, identify that the first region includes the object and merge the first region of interest and the first region to obtain a merged region, and
track a position of the object based on the merged region.

2. The electronic apparatus of claim 1, wherein the instructions that, when executed by the one or more processors individually or collectively, further cause the electronic apparatus to:
identify a second region including pixels including depth information less than the threshold distance in a second depth image corresponding to a second color image received from the second sensor,
obtain second intersection information between the first region and the second region,
based on the obtained second intersection information being the threshold value or more, identify that the second region includes the object, and
track the position of the object based on the first region and the second region.

3. The electronic apparatus of claim 2, wherein the instructions that, when executed by the one or more processors individually or collectively, further cause the electronic apparatus to:
input a second color image received from the first sensor to the neural network model, and
based on a region of interest being not identified in the second color image based on an output of the neural network model, identify the second region including the pixels including the depth information less than the threshold distance in the second depth image corresponding to the second color image.

4. The electronic apparatus of claim 2, wherein the instructions that, when executed by the one or more processors individually or collectively, further cause the electronic apparatus to:
based on a proportion of pixels including the depth information less than the threshold distance in the second depth image being less than a threshold proportion, obtain a second region of interest including the object from the first color image by inputting the second color image to the neural network model,
identify whether a distance between the object included in the second region of interest and the electronic apparatus is less than a threshold distance,
based on the identified distance being less than the threshold distance, identify the second region including the pixels including the depth information less than the threshold distance among a plurality of pixels included in the second depth image,
obtain third intersection information between the second region of interest and the second region, and
based on the obtained third intersection information being a threshold value or more, identify that the second region includes the object.

5. The electronic apparatus of claim 4, wherein the instructions that, when executed by the one or more processors individually or collectively, further cause the electronic apparatus to, based on the identified distance being the threshold distance or more, track the position of the object based on the first region of interest, the first region, and the second region of interest.

6. The electronic apparatus of claim 1, wherein the instructions that, when executed by the one or more processors individually or collectively, further cause the electronic apparatus to:
based on the obtained intersection information being the threshold value or more, obtain a first merged region in which the first region of interest and the first region are merged,
identify a second region including pixels including depth information less than the threshold distance in a second depth image corresponding to a second color image received from the second sensor,
obtain second intersection information between the first merged region and the second region,
based on the obtained second intersection information being the threshold value or more, identify that the second region includes the object, and
track the position of the object based on the first merged region and the second region.

7. The electronic apparatus of claim 6, wherein the instructions that, when executed by the one or more processors individually or collectively, further cause the electronic apparatus to, based on a proportion of pixels including depth information less than the threshold distance in the second depth image being a threshold proportion or more, identify the second region including pixels including depth information less than the threshold distance among a plurality of pixels included in the second depth image.

8. The electronic apparatus of claim 1, wherein the processor is instructions that, when executed by the one or more processors individually or collectively, further cause the electronic apparatus to, based on the identified distance being the threshold distance or more, identify the position of the object based on the first region of interest.

9. The electronic apparatus of claim 1,
wherein the first sensor comprises at least one of a camera or a red, green, and blue (RGB) color sensor, and
wherein the second sensor comprises at least one of a stereo vision sensor, a Time-of-Flight (ToF) sensor, or a light detection and ranging (LiDAR) sensor.

10. A method an electronic apparatus, the method comprising:
based on a first color image being obtained via a first sensor, obtaining, by the electronic apparatus, a first region of interest from the first color image by inputting the first color image to a neural network model; and
identifying, by the electronic apparatus, whether a distance between an object included in the first region of interest and the electronic apparatus is less than a threshold distance,
wherein the identifying comprises:
based on the identified distance being less than the threshold distance, identifying, by the electronic apparatus, a first region including pixels including depth information less than the threshold distance among a plurality of pixels included in a first depth image corresponding to the first color image,
obtaining, by the electronic apparatus, intersection information between the first region of interest and the first region,
based on the obtained intersection information being a threshold value or more, identifying, by the electronic apparatus, that the first region includes the object and merging the first region of interest and the first region to obtain a merged region, and
tracking a position of the object based on the merged region.

11. The method of claim 10, further comprising:
identifying a second region including pixels including depth information less than the threshold distance in a second depth image corresponding to a second color image received from a second sensor;
obtaining second intersection information between the first region and the second region;
based on the obtained second intersection information being the threshold value or more, identifying that the second region includes the object; and
tracking the position of the object based on the first region and the second region.

12. The method of claim 11, further comprising:
inputting a second color image received from the first sensor to the neural network model,
wherein the identifying of the second region comprises, based on a region of interest being not identified in the second color image based on an output of the neural network model, identifying the second region including the pixels including the depth information less than the threshold distance in the second depth image corresponding to the second color image.

13. The method of claim 11, further comprising:
based on a proportion of pixels including the depth information less than the threshold distance in the second depth image being less than a threshold proportion, obtaining a second region of interest including the object from the first color image by inputting the second color image to the neural network model; and
identifying whether a distance between the object included in the second region of interest and the electronic apparatus is less than a threshold distance,
wherein the identifying of the second region comprises, based on the identified distance being less than the threshold distance, identifying the second region including the pixels including the depth information less than the threshold distance among a plurality of pixels included in the second depth image, and
wherein the method further comprises:
obtaining intersection information between the second region of interest and the second region, and
based on the obtained intersection information being a threshold value or more, identifying that the second region includes the object.

14. The method of claim 11, wherein the neural network model comprises at least one of: a trained convolution neural network (CNN), a deep neural network (DNN) model of a Recurrent Neural Network (RNN), a Long Short-Term Memory Network (LSTM), a Gated Recurrent Units (GRU), or a Generative Adversarial Networks (GAN).

15. The method of claim 11, wherein the neural network model comprises a neural network model trained to identify, based on the first color image, a region predicted to include the object in the first color image as the first region of interest.

16. The method of claim 15, wherein the neural network model comprises a neural network model trained to identify a region in which a pixel value is changed by comparing the first color image preceding in chronological sequence and a following second color image, and determine the identified region as the first region of interest predicted to include the object.

17. The method of claim 10, further comprising:
based on the obtained intersection information being the threshold value or more, obtaining a first merged region in which the first region of interest and the first region are merged;
identifying a second region including pixels including depth information less than the threshold distance in a second depth image corresponding to a second color image received from a second sensor;
obtaining third intersection information between the first merged region and the second region;
based on the obtained third intersection information being the threshold value or more, identifying that the second region includes the object; and
tracking the position of the object based on the first merged region and the second region.

18. The method of claim 17, wherein the identifying of the second region comprises, based on a proportion of pixels including depth information less than the threshold distance in the second depth image being a threshold proportion or more, identifying the second region including pixels including depth information less than the threshold distance among a plurality of pixels included in the second depth image.

* * * * *